United States Patent [19]

Ekman

[11] 4,211,253

[45] Jul. 8, 1980

[54] COUPLING DEVICE

[75] Inventor: Kjell R. Ekman, Zug, Switzerland

[73] Assignee: Ekman Engineering AG, Zug, Switzerland

[21] Appl. No.: 858,875

[22] Filed: Dec. 8, 1977

Related U.S. Application Data

[63] Continuation of Ser. No. 688,795, May 21, 1976, abandoned.

[30] Foreign Application Priority Data

May 30, 1975 [CH] Switzerland .................. 62018/75

[51] Int. Cl.$^2$ .............................................. F16L 37/28
[52] U.S. Cl. .............................. 137/594; 137/614.03
[58] Field of Search ................. 141/44, 45, 59, 99, 141/293, 294, 295; 137/594, 614.03, 614.05; 91/432

[56] References Cited

U.S. PATENT DOCUMENTS

| 2,307,427 | 1/1943 | Smith | 141/294 |
|---|---|---|---|
| 2,471,798 | 5/1949 | Thomas | 137/594 |
| 3,171,448 | 3/1965 | Fromm | 137/594 |
| 3,217,762 | 11/1965 | Burchett | 141/293 X |
| 3,318,346 | 5/1967 | Maltner | 141/293 |
| 3,513,887 | 5/1970 | Limandri | 141/293 X |
| 3,570,543 | 3/1971 | Eckman | 137/614.04 X |
| 3,729,023 | 4/1973 | Hammond | 137/614.03 |

*Primary Examiner*—Robert G. Nilson
*Attorney, Agent, or Firm*—Pollock, Vande Sande & Priddy

[57] ABSTRACT

A coupling device has two detachably connectable parts which are provided with two valves that are activated in the connected position of the parts. In said connected position, two separate channels are formed through the coupling device; the first channel transmits to a first medium and the second channel transmits to a second medium. The first channel extends through a unit positioned in the coupling device. The unit slidingly moves in the longitudinal direction of the coupling device during connection of the parts. The sliding movement of the unit is coordinated with the opening movement of the valve of the first part.

11 Claims, 1 Drawing Figure

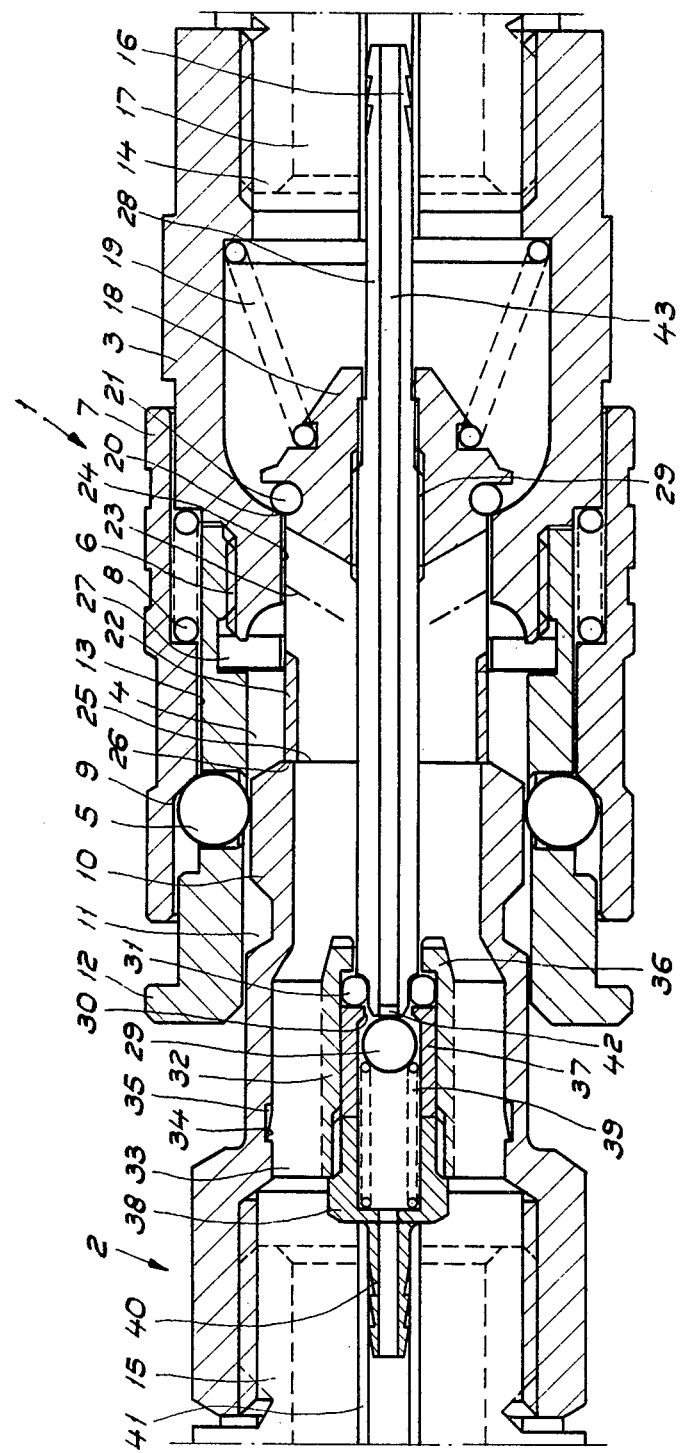

COUPLING DEVICE

This is a continuation of application Ser. No. 688,795, filed May 21, 1976, now abandoned.

FIELD OF THE INVENTION

The present invention relates to a coupling device comprising two detachably connectable parts which in their connected position, form two separated through passages equipped with valves that are activated in the connected position. An inner unit, in the form of an elongated tube forms one of the two passages extending partly in the longitudinal direction through said parts.

More specifically the invention relates to the type of quick-couplings which are used to connect compressed air to different kinds of air operated equipment and machines. The first part of the quick-coupling device connects to a conduit (tube, hose, etc.) that supplies a source of compressed air, while the second part connects to a conduit (tube, hose, etc.) that extends to a tool or machine.

In equipment of this kind there is a need to conduct lubricating oil from the lubrication source to the moving parts of the tool or machine, which is accomplished by means of a channel or passage (flexible hose) for oil positioned within the air pipe.

OBJECT OF THE PRESENT INVENTION

The present invention especially concentrates on the problems of creating a coupling device that includes separated channels or passages, and is efficient, simple and smoothly working, and quick-coupling.

A further purpose of the invention is to connect the separated passages in such a way that the passage for the lubricant is connected prior to the passage for the compressed air. This prevents pollutive particles in the air passage from reaching the lubricant in the tool or machine, and prevents fouling of the lubricating system and endangering the function of the valve.

A third object of the invention is to create a coupling device of extreme simplicity, requiring only low manufacturing costs in spite of high demands as to standards of functioning. The dimensions of the coupling device are small compared to the air pressure (for instance 300 kilopond/cm$^2$ (30 MPa) or more) transferred by the coupling device.

A fourth object of the invention is to achieve a rugged construction, sufficient to resist everyday hard use where it for instance is of importance that the long tube comprising parts of the passage for the lubrication oil is not displaced in relation to the second part, thereby preventing the connection of the two parts.

SUMMARY OF THE INVENTION

What may be regarded as the main feature of the quick-connect is that the coupling inner unit (is slidable in the longitudinal direction of the coupling parts during) the connection of said parts, and that the sliding displacement of the inner unit is coordinated with the opening movement of the valve of the first part. In a further embodiment of the invention, the elongated tube extends through the valve of the first part and is screwed on to the said valve, causing the valve and the tube to move together.

BRIEF DESCRIPTION OF THE DRAWINGS

A presently suggested embodiment of a coupling device displaying the significant features of the invention is described below by means of the drawing in which is shown a cross-section of the parts comprised in the coupling device.

DESCRIPTION OF THE PREFERRED EMBODIMENT

The drawing illustrates a first part 1, and a second part, designated 2. The first part comprises a casing 3, with one end connected to a holder 4 provided with locking balls 5. The holder 4 is screwed by means of thread 6 on to part 3, surrounding part 3 and holder 4, in the longitudinal direction of the coupling device, is a manually operated ratchet sleeve 7, with an associated operating spring 8. The ratchet sleeve has on its inner shaped surface an obliquely shaped surface 9 which interacts with the locking balls 5. The second part 2 is equipped with a portion 10 that extends into the holder 4. A groove 11 is located on portion 10; whereby, the second part 2 is lockable to the holder 4 by means of the locking balls 5. When parts 1 and 2 are in a completely separated condition, the spring 8 acts on the ratchet sleeve 7 to force said sleeve 7 to bear against the raised flange 12 of the holder 4. Parts of an inner surface 13 of the ratchet sleeve 7 hold the locking balls pressed inwardly thus preventing the insertion of part 2 into part 1 unless the ratchet sleeve 7 is manually brought back to the condition shown in the drawing, where the locking balls 5 located adjacent the front part of part 2 can be pressed against the surface 9. A further telescoping movement of the parts 1 and 2 from the condition shown in the drawing positions the groove within the ratchet sleeve 7, with the obliquely shaped surface 9 being pressed against the balls 5 by the spring 8. To effect disconnection of the parts 1 and 2, the ratchet sleeve 7 is manually moved in the working direction of the spring 8, after which part 2 is pulled out. Those connection and disconnection movements are well known and have no bearing on the invention proper.

Part 1 has at that end not interacting with part 2, a nipple 14 or equivalent, and in a similar manner part 2 has a nipple 15 or equivalent. The connections between their parts 1 and 2 and the nipples are designed in ways already known. The nipple 14 is in this case connected to air pressure and lubrication oil sources, while the nipple 15 is connected to one or more well known air machines (air tools). The invention may, of course, be used for transferring other types of media.

Part 1 is connected via a plastic tube 16 or equivalent connected to a source of lubrication oil, consisting of an oil supplier emitting the oil drip by drip. The tube 16 is concentrically positioned in a passage 17 which transmits compressed air, said passage 17 being connected to a compressor or equivalent. Furthermore, part 1 is equipped with a valve 18 which is urged by a conical spring 19 against a tightening 21 and seat 20 in part 1. The valve 18 has in addition to the part supporting the tightening 21 a part 22, in the form of a hollow cylinder, with through holes in its cylindrical wall; two of which are indicated in the drawing by their central lines 23. The valve 18 is guided, via its parts 22, by an inner guiding surface 24 in part 1. When the valve 18 is urged in a right hand direction in the drawing, the holes in the wall of part 22 are exposed and the passage 17 extending through the coupling device is completed. The manual movement of part 2 causes the movement of the valve 18. The foremost position 10 of part 2 has an actuating surface 25, which interacts with an end surface 26 on part 22 to cause movement of the valve 18.

Positioned between the casing part 3 and the holder 4 is a disc gasket 27. In the connected position of parts 1 and 2, the front end of part 1 presses against disc gasket 27 resulting in an efficient seal being formed between the elements comprising the air passage. The disc gasket 27 may consist of a rubber seal (Nitril , Viton, etc.) having a shore number of 55-70. An inner unit in the form of a long tube 28 is located concentrically through the valve 18. The tube 28 has an external thread 29 which screws into a threaded through hole in the valve 18. When the threaded parts are to be connected, a tightening substance (for instance Loc-tite) must be applied to secure a pressure-tight connection. The tube 28 extends from one end of part 1 to the other. At the end of tube 28 towards the nipple 14 the plastic tube 16 is connected. Recesses on the outer surface of tube 28 make it easier to engage and position tube 16. The tube 28 is positioned so as not to extend beyond a plane through the elements 29-31 are positioned in a holder comprising a hub part 32 and three spoke formed members 33, which center the hub part in the second part 2. The holder fastens to the inner wall of the second part 2. The holder is made of plastic material or equivalent, and is fastened to part 2 by means of locking tabs 34 interacting with internal indentations 35 on the inner wall of part 2. The hub part 32 has at one of its ends an inwardly protruding edge 36. A tightening ring 31 is positioned within the holder between this edge 36 and the forward edge of lining part 37 with its seat 30. A nipple 38 is screwed on to an internal thread on the hub part 32, and within the nipple 38 and the lining part 37 a helical spring 39 acts between an end surface of the nipple 38 and the ball 29. As a result, ball 29 is pressed by the spring 39 against the seat 30.

The nipple 38 has a connection tube 40 which connects to a plastic tube 41 from the lubrication system of a tool or a machine. Also, the connection tube 40 is designed to make it easy to attach and position the plastic tube 41. The air passage is located adjacent the external side of the hub part 32 between the spoke formed parts 33 and extends in the longitudinal direction of the hub part 32. The tube 28 is provided at its end which interacts with the elements 29-31 of the valve of the second part with a narrowed or recessed part which forms an elongated sealing surface. As the tube is pushed into the holder, its edge 36 serves as a guiding surface for the outer side of the tube. The narrowed part the tube 28 interacts with the seal 31, thereby effecting an efficient seal between the two passages. The end of tube 28 interacts with the ball 29 to lift said ball 29 from its seat 30. The end of the tube is equipped with indentations 42, creating a passage between the interior of the tube and the interior of the holder when the ball is lifted. The inwardly protruding edge 36 extends partly along the section of the seal ring 31. The edge 36 extends around 15%-90% of said section, preferably 50%. The portion of the sealing surface near the end of the tube 28 may be oblique. Said sealing surface extends, via a distinct shoulder, to the outer surface of the unit positioned below the sealing surface and adjacent to the inwardly protruding edge.

The distances, between the end of the tube 28 and the actuating surface 26 of the valve of the first part, the surface 25 of part 2 and the holder for the seal, and the ball and the seat are chosen to achieve a relative displacement between the end of the tube 28 and the holder before the surface 25 displaces the surface 26 of part 22 and thereby activates the valve of the first part. During a first phase of the coupling engagement, the narrowed part of the end of the tube 28 interacts with the seal 31, effecting a relationship. During a second phase of the coupling engagement, the ball 29 is lifted from its seat creating a first sealed passage for the oil. After the oil passage is created, further engagement of the coupling will displace surfaces 25, 26 and said first valve 18 against said first spring creating a second, separate sealed passage. When the parts 1 and 2 are locked together by action of the balls 5, the valve of the first part is displaced to the extent that the holes 23 are exposed. This structural arrangement implies that the force of the conical spring 19 exceeds the spring force of the helical spring 39. However, the relationship is not critical due to the fact that the movement for the valve of the first part essentially exceeds the opening movement necessary to open the valve of the second part. The above described coupling works as follows. In the unactivated condition when the parts are separated from each other, the air passage 7 is closed by the valve 18. An oil passage 43 is open through the tube but because the amount of lubrication oil is regulated by a supplier, oil is not fed when the coupling is unactivated. When the parts 1 and 2 are brought together and locked to each other, the relative movement between the tube 28 and the holder is achieved during the first phase of the engagement, at first creating a seal between the sealing ring 31 and the tube, and there after lifting the ball 29 from its seat and opening the lubrication oil passage towards the tool or machine to connect with the lubrication oil source. The passage is formed through the tube 28, the seat 30, the holder, the nipple 38 and its connection tube 40. At the completion of the connection of the parts 1 and 2, the valve 18 is displaced and the air passage is formed through the passage at the seat 20, the holes 23 of the valve 18 and the hollow part of the valve within part 22 and; further between the spoke-formed members 33 and the nipple 15. At the disconnection of the parts, the process is reversed, whereby, the valve 18 is closed first and after that the valve in the second part 2.

Manufacturing the parts of the coupling is extremely simple. Inter alia, the tube 28 is screwed on to the valve 18 and at the same time tightened with a tightening substance. The holder of the valve of the second part 2 is locked to the second part by a snap-action device 34. First, the seal ring 31 is mounted and after that, the lining part 37 is positioned. Next the ball 29 and the spring 39 are dropped into place, and finally the nipple 38 is screwed on to the holder. The conical spring 19 has a known cross portion at its base, which cross portion limits the lifting height of the valve 18. Said cross portion follows the spring diameter at the spring base and cooperates with that end surface on the valve 28 which faces said spring base. Similarly the lifting height of the valve of the second part 2 is determined i.a. by means of the cooperation between the end surfaces 25 and 26 on the part 2 and portion 22. In the shown embodiment, seal 31 cannot be destroyed by squeezing and the valves will always be opened safely. In the case spring 39 is hard in comparison with spring 19, a safe opening of the valve of the second part will be effected after the cooperation between the valve 18 and the cross portion on the spring 19 when the surfaces 26 and 25 are forced together.

The invention is not restricted to the above shown embodiment; but, may be subjected to modifications within the scope of the following patent claims.

What I claim is:

1. A quick-connect coupling device for supplying a plurality of separate fluids from respective pressurized fluid sources to separate output conduits for said fluids without admixing of the fluids in the coupling device, said coupling device comprising:

a first coupling part having first and second axial fluid flow passages extending therethrough, a second coupling part also having first and second axial fluid flow passages extending therethrough, said first and second coupling parts each having on a respective first end thereof means to permit the detechable coupling of said parts with their respective first and second fluid flow passages aligned to permit fluid flow therefrom, means responsive to the attainment by said first and second coupling parts of a first predetermined coupling relationship for completing a continuous fluid flow path only through the respective first fluid flow passages of said first and second parts, said responsive means being also responsive to the attainment by said first and second parts of a second predetermined coupling relationship to provide a continuous fluid flow path through the respective second fluid flow passages of said parts, wherein said responsive means comprises an elongated tubular member supported within said first coupling part, and a hollow holder member supported within said second coupling part, said holder surrounding and supporting a hollow cylinder-shaped lining member which, in turn, supports a first valve member and a first spring member such that the first valve member is pressed by said first spring against a seat formed at an end of said lining member, a sealing ring compressed between an inwardly protruding edge of said holder and said lining member, a recess formed in an outer edge of said elongated tubular member, whereby said lining member positions said sealing ring and also provides the seat against which the first valve member is biased by the first spring.

2. A quick-connect coupling device as set forth in claim 1 wherein said elongated tubular member includes an end located so as to abut said second coupling part when said first and second coupling parts are brought into their said first coupling relationship.

3. A quick-connect coupling as set forth in claim 2 wherein said elongated tubular member is formed with indentations on said end, with said elongated tubular member being supported in said first coupling part in such a manner that said end does not extend beyond the associated end of said first coupling part which faces said second coupling part, to assure that said first fluid flow passage will be completed and sealed prior to completion of said second fluid flow passage, while said indentations form passages for fluid flow from said elongated tubular member into said second coupling part upon establishment of said first coupling relationship.

4. A quick-connect coupling device as set forth in claim 2 wherein said elongated tubular member supports a second valve member which is axially movable with said tubular member, said second valve member being slidable within an inner guide surface of said first coupling part and urged against a seat on said first coupling part by a second spring.

5. A quick-connect coupling as set forth in claim 4 wherein an edge of said second coupling part which faces said first coupling part presses against a mating edge of a hollow cylindrical member formed with through holes, said second coupling part urging said cylindrical member and said second valve member against said second spring during establishment of said second predetermined coupling relationship to provide a second separate fluid flow passage through the now-opened through holes.

6. A quick-connect coupling device as set forth in claim 4 wherein said elongated tubular member is provided with a threaded section formed on its outer surface and said second valve is provided with a corresponding threaded section formed on its inner surface.

7. A quick-connect coupling as set forth in claim 4 wherein said holder is rigidly attached to the inner wall of said second coupling part by means of multiple spoke members, wherein the space between said spokes forms the second fluid flow passage through said second coupling part.

8. A quick-connect coupling as set forth in claim 7 wherein said first and second springs are chosen to allow said elongated tubular member to move said first valve member out of said seat against the force of said first spring prior to the movement of the second valve against said second spring, whereby said first continuous fluid flow passage through said elongated tubular member and first valve being completed and sealed prior to the completion of said separate second continuous fluid flow passage past said valve and between said spokes connected to said holder.

9. A sealing device for use with a quick-connect coupling to prevent mixing of two separate fluids passing therethrough and comprising:

a first coupling part having first and second axial fluid flow passages extending therethrough;

a second coupling part having first and second axial fluid flow passages extending therethrough;

an elongated tubular member extending through said first coupling part and having a recess formed on an outer end surface;

a hollow holder mounted within said second coupling part and axially aligned with said elongated tubular member;

means responsive to the movement of said tubular member into said holder for providing a fluid tight seal therebetween;

wherein said responsive means comprises a hollow, cylindrically-shaped lining member located within said holder and a sealing ring also located within said holder and positioned between an inwardly protruding edge of said holder and an end wall of said lining member, with said sealing ring engaging and forming a fluid tight connection with said recessed outer end surface of said elongated tubular member during insertion of elongated tubular member into said holder;

and said responsive means further comprises a first valve member and a first spring member positioned within said lining member and biasing said valve member against a seat formed in an end portion of said lining member to prevent fluid flow through said hollow holder.

10. A device according to claim 9, wherein said holder is rigidly attached to an inner wall of said second coupling part.

11. A device according to claim 9, wherein said elongated tubular member is chosen with a specific length to allow said tubular member to move said first valve member from said seat only after said sealing ring is deformed into fluidtight sealing contact between said holder, said lining member and said recessed surface of said elongated tube.

* * * * *